US009652832B2

(12) United States Patent
Watanabe (10) Patent No.: US 9,652,832 B2
(45) Date of Patent: May 16, 2017

(54) IMAGE PROCESSING APPARATUS, IMAGE PICKUP APPARATUS, IMAGE PROCESSING METHOD, AND NON-TRANSITORY COMPUTER-READABLE STORAGE MEDIUM WHICH PERFORM IMAGE RESTORATION PROCESSING (71) Applicant: CANON KABUSHIKI KAISHA, Tokyo (JP)

(72) Inventor: Takeshi Watanabe, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/840,454

(22) Filed: Aug. 31, 2015

(65) Prior Publication Data
US 2016/0063683 A1    Mar. 3, 2016

(30) Foreign Application Priority Data
Sep. 2, 2014  (JP) ................. 2014-177861

(51) Int. Cl.
G06K 9/44 (2006.01)
G06T 5/00 (2006.01)
H04N 5/91 (2006.01)

(52) U.S. Cl.
CPC .............. *G06T 5/001* (2013.01); *H04N 5/91* (2013.01)

(58) Field of Classification Search
CPC .......... G06T 2207/10004; G06T 5/001; G06K 9/00255
See application file for complete search history.

(56) References Cited

U.S. PATENT DOCUMENTS 8,508,618 B2    8/2013  Kishine
8,798,389 B2    8/2014  Hatakeyama
(Continued)

FOREIGN PATENT DOCUMENTS

JP    2011123589 A    6/2011
JP    2012065187 A    3/2012
(Continued)

OTHER PUBLICATIONS

Extended European Search Report issued in European Appln. No. 15002509.6, mailed Feb. 24, 2016.

*Primary Examiner* — Eueng-Nan Yeh
(74) *Attorney, Agent, or Firm* — Rossi, Kimms & McDowell LLP (57) ABSTRACT An image processing apparatus (104) includes an image restoration filter storing unit configured to store an image restoration filter corresponding to image capturing condition information, an optical transfer function storing unit configured to store optical transfer function information, and an image restoration filter generating unit configured to determine whether a first image restoration filter corresponding to first image capturing condition information of a captured image is stored in the image restoration filter storing unit, select the first image restoration filter from the image restoration filter storing unit when the first image restoration filter is stored in the image restoration filter storing unit, and generate the first image restoration filter using the optical transfer function information when the first image restoration filter is not stored in the image restoration filter storing unit.

11 Claims, 4 Drawing Sheets (56) References Cited

U.S. PATENT DOCUMENTS

| | | | |
|---|---|---|---|
| 2007/0147790 A1* | 6/2007 | Saitou | H04N 19/40 |
| | | | 386/333 |
| 2010/0079626 A1 | 4/2010 | Hatakeyama | |
| 2010/0328480 A1 | 12/2010 | Kikuchi | |
| 2013/0050541 A1 | 2/2013 | Hatakeyama | |
| 2013/0215296 A1* | 8/2013 | Oniki | G06T 5/008 |
| | | | 348/241 |
| 2016/0005151 A1 | 1/2016 | Hatakeyama | |

FOREIGN PATENT DOCUMENTS

| | | |
|---|---|---|
| JP | 2014150423 A | 8/2014 |
| WO | 2014119768 A1 | 8/2014 |

\* cited by examiner

IMAGE PROCESSING APPARATUS, IMAGE PICKUP APPARATUS, IMAGE PROCESSING METHOD, AND NON-TRANSITORY COMPUTER-READABLE STORAGE MEDIUM WHICH PERFORM IMAGE RESTORATION PROCESSING

BACKGROUND OF THE INVENTION

Field of the Invention

The present invention relates to an image processing apparatus which performs image restoration processing on a captured image.

Description of the Related Art

For an object captured via an image pickup optical system, light emitted from one point cannot be converged to another point and has a minute spread due to an influence of a diffraction, an aberration, or the like that occurs in the image pickup optical system. Such a minutely-spread distribution is referred to as a PSF (point spread function). Due to the influence of the image pickup optical system, the captured image is formed with the PSF convolved with the image, and accordingly, the image is blurred and its resolution is deteriorated.

Recently, the captured image is typically stored as electronic data, and a method (image restoration processing) has been proposed which corrects an image deterioration caused by the image pickup optical system by performing image processing.

Japanese Patent Laid-open No. 2012-65187 discloses an EDOF technology in which a wavefront modulation element is inserted into an image pickup optical system to enlarge a depth of focus and to uniformize optical characteristics in an image, and thus image restoration processing is performed to improve the quality of the image. According to the method disclosed in Japanese Patent Laid-open No. 2012-65187, the optical characteristics are uniformized for various image capturing conditions, and thus a process of generating an image restoration filter is simplified and the processing speed can be improved.

However, in order to use the EDOF technology disclosed in Japanese Patent Laid-open No. 2012-65187, it is necessary to insert the wavefront modulation element in the image pickup optical system. Therefore, in the method disclosed in Japanese Patent Laid-open No. 2012-65187, the speed of the image restoration processing cannot be improved by using a typical image pickup apparatus.

SUMMARY OF THE INVENTION

The present invention provides an image processing apparatus, an image pickup apparatus, an image processing method, and a non-transitory computer-readable storage medium which improve the speed of image restoration processing.

An image processing apparatus as one aspect of the present invention includes an image restoration filter storing unit configured to store an image restoration filter corresponding to image capturing condition information, an optical transfer function storing unit configured to store optical transfer function information, and an image restoration filter generating unit configured to determine whether a first image restoration filter corresponding to first image capturing condition information of a captured image is stored in the image restoration filter storing unit, select the first image restoration filter from the image restoration filter storing unit when the first image restoration filter is stored in the image restoration filter storing unit, and generate the first image restoration filter using the optical transfer function information when the first image restoration filter is not stored in the image restoration filter storing unit.

An image pickup apparatus as another aspect of the present invention includes an image pickup unit configured to photoelectrically convert an optical image formed via an image pickup optical system to output a captured image an image restoration filter storing unit configured to store an image restoration filter corresponding to image capturing condition information, an optical transfer function storing unit configured to store optical transfer function information, and an image restoration filter generating unit configured to determine whether a first image restoration filter corresponding to first image capturing condition information of the captured image is stored in the image restoration filter storing unit, select the first image restoration filter from the image restoration filter storing unit when the first image restoration filter is stored in the image restoration filter storing unit, and generate the first image restoration filter using the optical transfer function information when the first image restoration filter is not stored in the image restoration filter storing unit.

An image processing method includes the steps of acquiring image capturing condition information of a captured image, determining whether an image restoration filter corresponding to the image capturing condition information is stored in an image restoration filter storing unit, acquiring the image restoration filter from the image restoration filter storing unit when the image restoration filter is stored in the image restoration filter storing unit, and acquiring an optical transfer function information from an optical transfer function storing unit and generating the image restoration filter by using the optical transfer function information when the image restoration filter is not stored in the image restoration filter storing unit.

A non-transitory computer-readable storage medium storing an image processing program which causes a computer to execute a process comprising the steps of acquiring image capturing condition information of a captured image, determining whether an image restoration filter corresponding to the image capturing condition information is stored in an image restoration filter storing unit, acquiring the image restoration filter from the image restoration filter storing unit when the image restoration filter is stored in the image restoration filter storing unit, and acquiring an optical transfer function information from an optical transfer function storing unit and generating the image restoration filter by using the optical transfer function information when the image restoration filter is not stored in the image restoration filter storing unit.

Further features and aspects of the present invention will become apparent from the following description of exemplary embodiments with reference to the attached drawings.

DESCRIPTION OF THE EMBODIMENTS

Exemplary embodiments of the present invention will be described below with reference to the accompanied drawings.

First of all, an outline of an image processing method (image restoration processing) in this embodiment will be described. The following expression (1) is satisfied where, in a real space (x,y), f(x,y) is an image which is not deteriorated by an optical system, h(x,y) is a PSF (point spread function), and g(x,y) is a deteriorated image.

$$g(x,y) = \iint f(X,Y) * h(x-X, y-Y) dX dY \quad (1)$$

When the Fourier transform is performed for expression (1) to convert the real space (x,y) to a frequency space (u,v), the following expression (2) is satisfied.

$$G(u,v) = F(u,v) * H(u,v) \quad (2)$$

In expression (2), F(u,v), G(u,v), and H(u,v) are results of the Fourier transform of f(x,y), g(x,y), and h(x,y), respectively. Therefore, the following expression (3) is satisfied.

$$F(u,v) = G(u,v)/H(u,v) \quad (3)$$

Expression (3) means that the result F(u,v) of the Fourier transform of the image f(x,y) which is not deteriorated can be obtained by dividing the result G(u,v) of the Fourier transform of the deteriorated image g(x,y) in the frequency space by the result H(u,v) of the Fourier transform of the point spread function h(x,y). Therefore, the image f(x,y) which is not deteriorated can be obtained by performing the inverse Fourier transform for F(u,v).

Actually, however, if such processing is performed to obtain the image which is not deteriorated, a noise caused by an image pickup element is amplified and there is a high possibility of generating ringing on an image. Due to this negative effect on the image processing, it is difficult to obtain an appropriate image by a dividing method using simple inverse characteristics.

As a method of restoring an image to suppress the amplification of the noise, using the Wiener filter W(u,v) represented by the following expression (4) is known.

$$W(u,v) = 1/H(u,v) * |H(u,v)|^2 / (|H(u,v)|^2 + \Gamma) \quad (4)$$

In expression (4), symbol H(u,v) denotes an optical transfer function (OTF), and symbol $\Gamma$ denotes a constant to reduce an amount of the amplification of the noise.

Multiplying W(u,v) represented by expression (4) by the result G(u,v) of the Fourier transform of the deteriorated image g(x,y), a phase component of the PSF caused due to the diffraction or the aberration that occurs in the optical system becomes zero and frequency characteristics of an amplitude component are amplified to be able to obtain a high-resolution and appropriate image. In other words, frequency space information R(u,v) of the image restored by the image restoration processing using the Wiener filter W(u,v) is represented as the following expression (5).

$$R(u,v) = G(u,v) * W(u,v) \quad (5)$$

Since the image restoration processing according to the Wiener filter is performed by using optical characteristics of an image pickup apparatus, a processed image is not broken and a high-definition image can be obtained. On the other hand, it is necessary to store optical characteristic data, which are enormous amounts of data, in a system (image pickup apparatus). Therefore, it is realistic to store only minimum optical characteristic data. When the system storing the minimum optical characteristic data is used, it is necessary to generate image restoration filters by acquiring various image capturing conditions for images on which the image restoration processing are to be processed. The image capturing condition contains information such as a pixel pitch of an image pickup element and an optical low-pass filter in addition to a focal length of an image pickup optical system, an F number, and a photographing distance. In order to generate the image restoration filters by acquiring various image capturing conditions, it takes a lot of time and accordingly it is difficult to perform the processing in real time while an image is being captured.

In each embodiment described below, a configuration and a method of improving the speed of the image restoration processing will be described.

Embodiment 1

Figure 1:
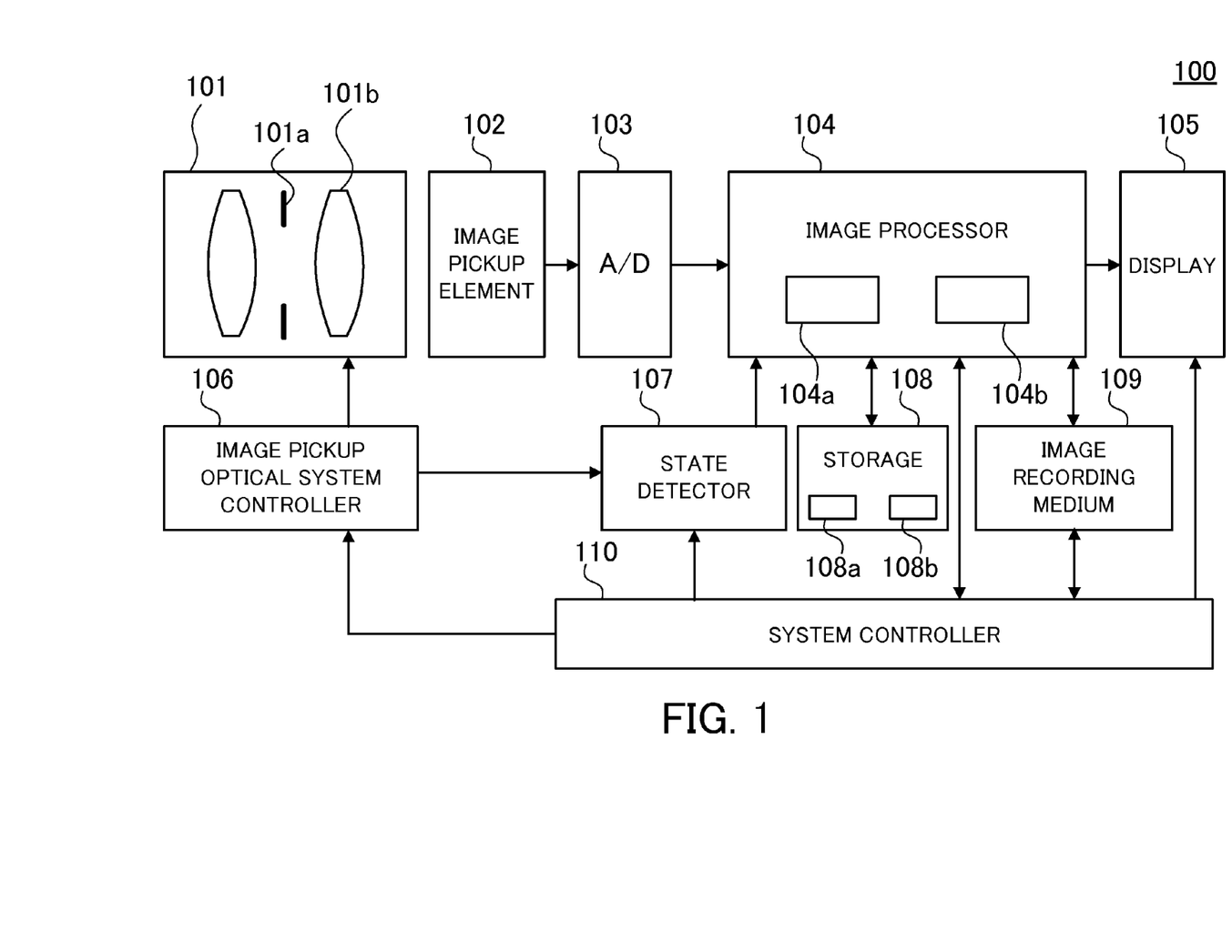
FIG. 1 is a block diagram of an image pickup apparatus in Embodiment 1.

First of all, referring to FIG. 1, an image pickup apparatus in Embodiment 1 of the present invention will be described. FIG. 1 is a block diagram of an image pickup apparatus 100 in this embodiment. The image pickup apparatus 100 includes an image processor 104 (image processing apparatus) capable of performing an image processing method described below.

In the image pickup apparatus 100, an object (not illustrated) is imaged on an image pickup element 102 via an image pickup optical system 101 including an aperture stop 101a (or light shielding member) and a focus lens 101b. In this embodiment, the image pickup optical system 101 is an interchangeable lens (lens apparatus) removably mounted on an image pickup apparatus body including the image pickup element 102. This embodiment, however, is not limited to this, and can be applied also to an image pickup apparatus including an image pickup apparatus body and an image pickup optical system 101 integrated with each other.

An aperture value (F number) is determined by the aperture stop 101a or the light shielding member. The image pickup element 102 photoelectrically converts an object image (optical image) formed via the image pickup optical system 101 to output an image (captured image). An electric signal output from the image pickup element 102 is output to an A/D converter 103. The A/D converter 103 converts the electric signal (analog signal) input from the image pickup element 102 to a digital signal and then outputs the digital signal (captured image data) to the image processor 104. The image pickup element 102 and the A/D converter 103 constitute an image pickup unit configured to photoelectrically convert the optical image (object image) formed via the image pickup optical system 101 to output the captured image.

The image processor 104 performs predetermined image processing on the digital signal (captured image) output from the A/D converter 103 by using information of a state detector 107 and a storage 108. Especially, the image processor 104 of this embodiment performs image restoration processing on the captured image to output a corrected image (restored image). In this embodiment, the image processor 104 includes an image restoration filter generating unit 104a and an image restoration processing unit 104b.

The storage 108 (storage unit) includes an image restoration filter storing unit 108a that stores an image restoration filter and an optical transfer function storing unit 108b that stores optical transfer function data (information relating to an optical transfer function). Similarly, the storage 108 can store an image capturing condition acquired by the state detector 107. In this embodiment, the image processor 104 and the storage 108 constitute an image processing apparatus. In this embodiment, the image restoration filter storing unit and the optical transfer function storing unit can be included in the image processor 104, instead of the storage 108 provided outside the image processor 104.

The output image (restored image) processed by the image processor 104 is recorded in an image recording medium 109 in a predetermined format. A display 105 displays an image obtained by performing predetermined processing for display on the processed image in this embodiment. Alternatively, the display 105 may display a simply-processed image for high-speed display. The display 105 also displays a GUI to select an image restoration mode or a normal image capturing mode by a user. When the image restoration mode is selected by the user via the GUI on the display 105, a system controller 110 controls the image processor 104 to perform the image processing method described with reference to FIG. 1.

The system controller 110 includes a CPU, an MPU, or the like, and it controls a whole of the image pickup apparatus 100. More specifically, the system controller 110 controls each of the image processor 104, the display 105, an image pickup optical system controller 106, the state detector 107, and the image recording medium 109. The image pickup optical system controller 106 controls the motion of the image pickup optical system 101. The state detector 107 detects a state of the image pickup optical system 101 based on information of the image pickup optical system controller 106. In the image pickup apparatus 100, software (an image processing program) that realizes the image processing method described above can be supplied to the system controller 110 via a network or a storage medium, and then the system controller 110 can read out and execute the image processing program.

Figure 2:
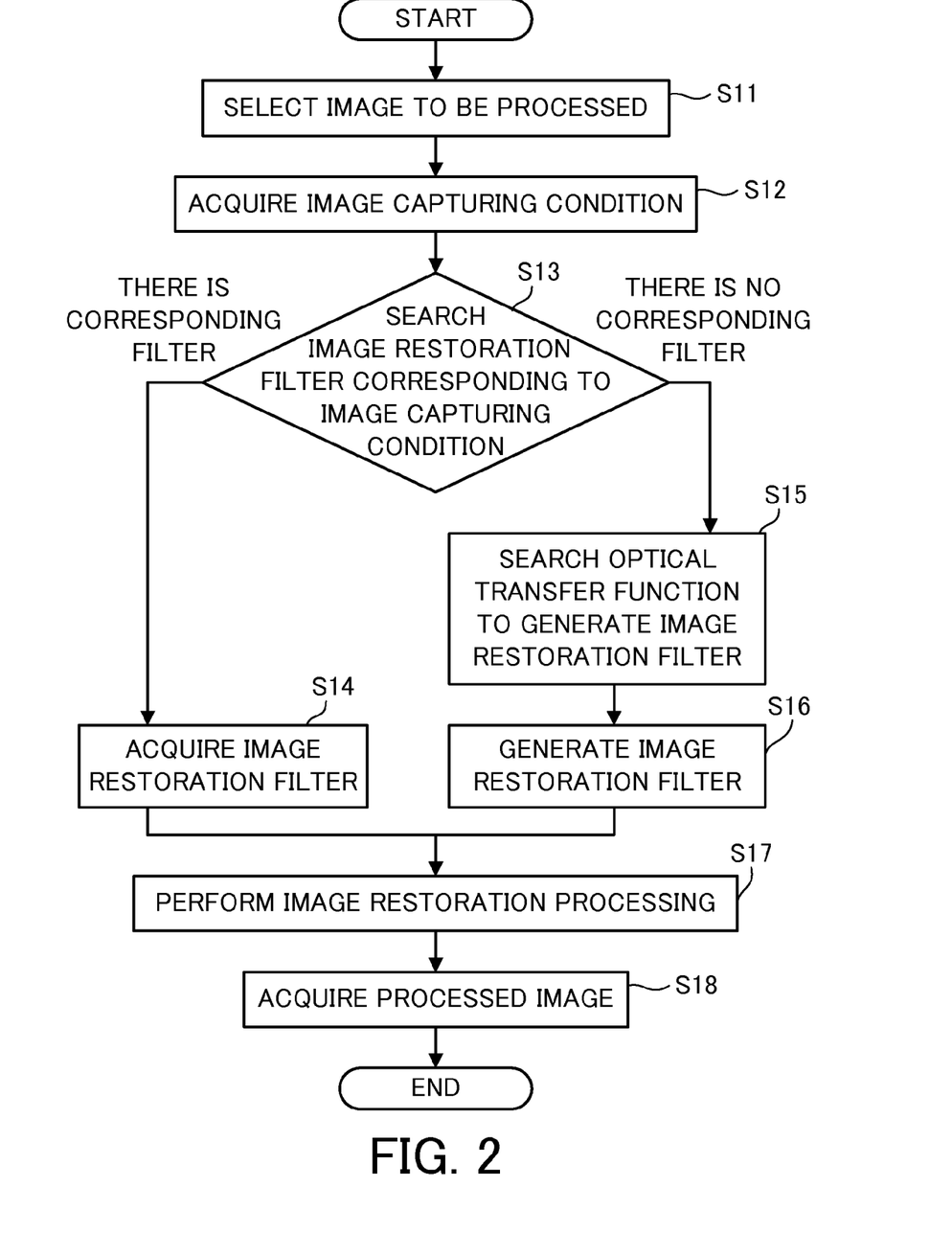
FIG. 2 is a flowchart of an image processing method in Embodiment 1.

Next, referring to FIG. 2, the image processing method in this embodiment will be described. FIG. 2 is a flowchart of the image processing method. Each step in FIG. 2 is performed mainly by the image processor 104 based on an instruction (command) of the system controller 110.

First, at step S11, the image processor 104 selects an image to be processed (captured image). Subsequently, at step S12, the image processor 104 acquires an image capturing condition (image capturing condition information) from the image to be processed (image on which restoration processing is to be performed). The image capturing condition contains an optical parameter determined when the image on which the restoration processing is to be performed is captured, that is, a focal length, an F number, an object distance, and the like. The image pickup optical system has optical characteristics that change depending on the image capturing condition such as the focal length, the F number, and the object distance. Accordingly, it is necessary to use an image restoration filter based on the optical characteristics corresponding to the combination of them.

The image pickup apparatus 100 of this embodiment includes the storage 108 (storage unit) that stores at least two different types of data, that is, the image restoration filter storing unit 108*a* that stores the image restoration filter and the optical transfer function storing unit 108*b* that stores the optical transfer function data. The image restoration filter storing unit 108*a* stores the image restoration filter corresponding to a specific image capturing condition. The optical transfer function storing unit 108*b* stores the optical transfer functions (information relating to the optical transfer functions) capable of corresponding (adaptable) to all combinations of the image capturing conditions.

Subsequently, at step S13, the image processor 104 searches (determines) whether or not an image restoration filter (first image restoration filter) corresponding to the image capturing condition (first image capturing condition information) acquired at step S12 is stored in the image restoration filter storing unit 108*a*. The image capturing condition is acquired based on information (image format) such as Exif (Exchangeable image file format) added to the image (captured image). When the corresponding image restoration filter (first image restoration filter) is stored in the image restoration filter storing unit 108*a*, at step S14, the image processor 104 acquires the corresponding image restoration filter from the image restoration filter storing unit 108*a*. Then, the image processor 104 performs the image restoration processing by using the acquired image restoration filter.

On the other hand, when the corresponding image restoration filter (first image restoration filter) is not stored in the image restoration filter storing unit 108*a*, the flow proceeds to step S15. At step S15, the image processor 104 searches and determines an optical transfer function to generate the corresponding image restoration filter from the optical transfer functions (optical transfer function data) stored in the optical transfer function storing unit 108*b*. Then, at step S16, the image processor 104 (image restoration filter generating unit 104*a*) generates the image restoration filter (first image restoration filter) based on the optical transfer function determined at step S15. As described above, the image processor 104 generates the corresponding image restoration filter based on the optical transfer function data stored in the optical transfer function storing unit 108*b*. When the optical transfer function data which coincide with the acquired image capturing condition do not contained in the optical transfer function storing unit 108*b*, the image processor 104 may use a plurality of optical transfer function data approximate or similar to the optical transfer function corresponding to the image capturing condition to generate the optical transfer function data corresponding to the image capturing condition by interpolation processing.

Subsequently, at step S17, the image processor 104 (image restoration processing unit 104*b*) performs the image restoration processing by using the image restoration filter acquired at step S14 or the image restoration filter generated at step S16. Then, at step S18, the image processor 104 obtains an image (restored image) on which the image restoration processing has been performed, and it outputs the image.

In this embodiment, when the image restoration filter corresponding to the acquired image capturing condition is contained in the image restoration filter storing unit 108*a*, it is not necessary to perform the processing to generate the image restoration filter, and thus the speed of the image restoration processing is improved. Accordingly, in this embodiment, a plurality of sets (combinations) of the image restoration filters corresponding to image capturing conditions are previously generated by using the optical transfer function data stored in the optical transfer function storing unit 108*b*, and they are stored in the image restoration filter storing unit 108*a*. It is preferred that the image restoration filter is generated while an image is not being captured so that the generation of the image restoration filter does not compete with (i.e., does not have an impact on) various processing, such as demosaicing and noise reduction, performed during capturing the image and an image capturing efficiency is not decreased. For example, the image restoration filter can be generated while the image pickup apparatus 100 is in a sleep mode.

Figure 3A:
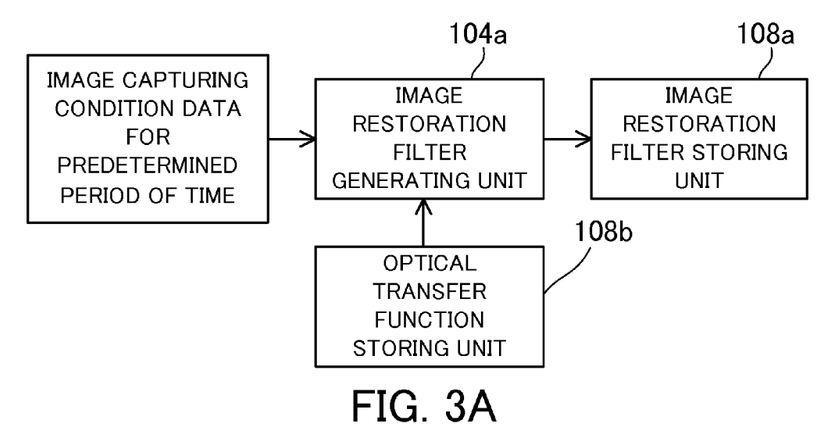
FIGS. 3A and 3B are explanatory diagrams of a method of generating an image restoration filter in Embodiment 1.
Figure 3B:
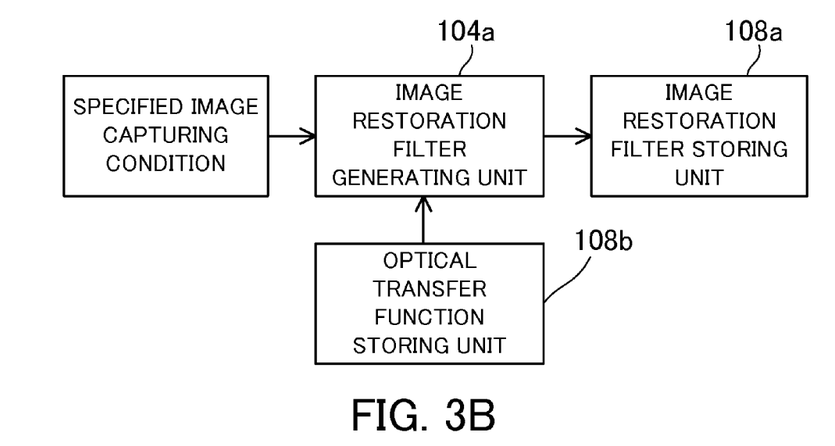

Next, referring to FIGS. 3A and 3B, a method of generating the image restoration filter by the image pickup apparatus 100 (image processing apparatus including the image restoration filter generating unit 104a, the image restoration filter storing unit 108a, and the optical transfer function storing unit 108b) in this embodiment will be described. FIGS. 3A and 3B are explanatory diagrams of the method of generating the image restoration filter in this embodiment.

As described above, the image pickup apparatus 100 of this embodiment includes storage regions to store at least two different types of data, that is, the image restoration filter storing unit 108a and the optical transfer function storing unit 108b. The optical transfer function storing unit 108b needs a capacity sufficient to generate image restoration filters corresponding to all image capturing conditions with high accuracy. On the other hand, the image restoration filter storing unit 108a only needs to store a few image restoration filters corresponding to part of the image capturing conditions, and accordingly it does not need a large capacity compared to the optical transfer function storing unit 108b.

FIG. 3A is a schematic diagram of illustrating a first method of generating the image restoration filter which is to be stored in the image restoration filter storing unit 108a. In other words, the image pickup apparatus 100 (the image processor 104 or the storage 108) accumulates image capturing conditions (image capturing condition data) of images captured within a certain period of time (a predetermined period of time). Then, the image pickup apparatus 100 (system controller 110) ranks the accumulated image capturing conditions based on a predetermined condition, and it inputs higher-ranking image capturing conditions to the image restoration filter generating unit 104a. The image restoration filter generating unit 104a uses the optical transfer function stored in the optical transfer function storing unit 108b for each of the input image capturing conditions to generate the image restoration filters corresponding to respective image capturing conditions. Then, the image restoration filter generated by the image restoration filter generating unit 104a is stored in the image restoration filter storing unit 108a.

FIG. 3B is a schematic diagram of illustrating a second method of generating the image restoration filter which is to be stored in the image restoration filter storing unit 108a. In other words, the image pickup apparatus 100 (system controller 110) inputs an image capturing condition specified by a user, and it stores the image restoration filter corresponding to the specified image capturing condition in the image restoration filter storing unit 108a. The second method is the same as the first method expect for the input of the image capturing condition. In the first method, a period of time to accumulate the image capturing conditions can be arbitrarily set. Furthermore, a timing to update the image restoration filter can be arbitrarily set. For example, the timing can be automatically set to update the image restoration filter once a month, or alternatively the user may determine the update timing manually.

Figure 4:
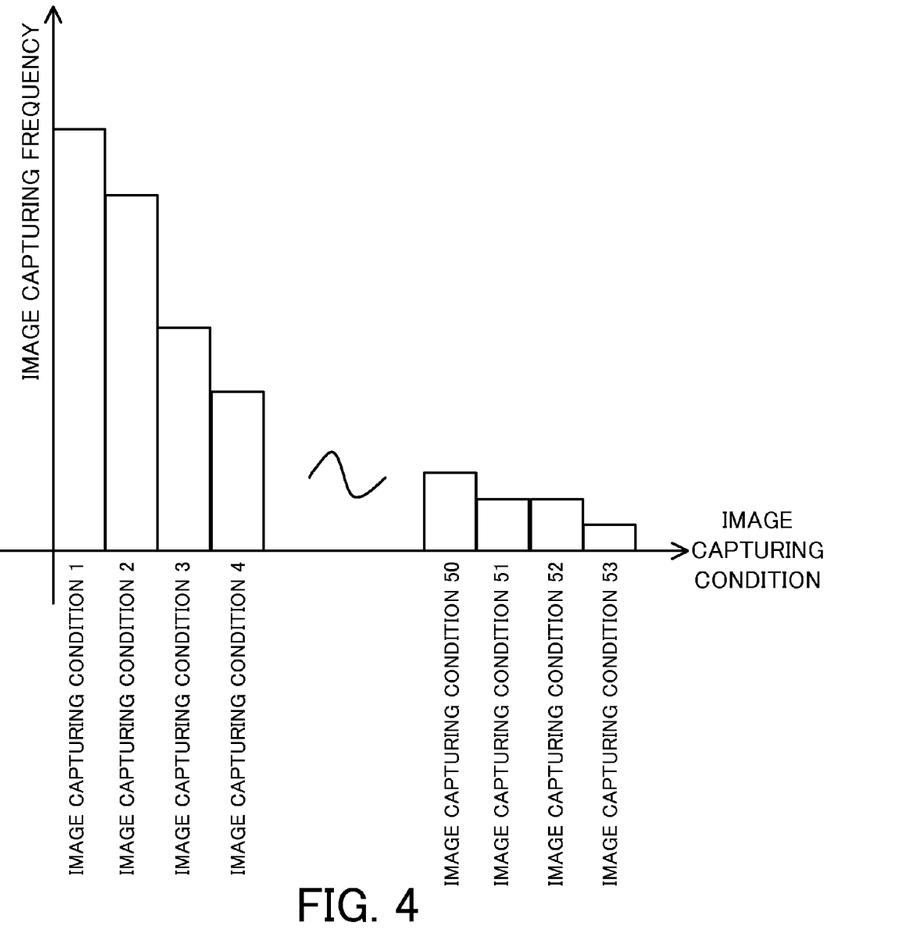
FIG. 4 is a diagram of illustrating an example of a ranking method performed in a first method of generating the image restoration filter in Embodiment 1.

FIG. 4 is a diagram of illustrating an example of a ranking method in the first method of generating the image restoration filter. The system controller 110 (image processor 104) stores image capturing conditions determined (captured) within a specific period of time (predetermined period of time or arbitrary period of time set by the user), and it ranks them in order of a frequency (image capturing frequency). In other words, it determines image capturing conditions to be stored depending on the image capturing frequency. The image capturing condition used in this case contains a focal length, an F number, and a photographing distance. In addition to them, the image capturing condition may contain information such as a lens ID to specify a lens when an image pickup system adaptable to an interchangeable lens is used. With respect to the number of image restoration filters to be stored in the image restoration filter storing unit 108a corresponding to the higher-ranking image capturing conditions in the ranked image capturing conditions can be set depending on a storage capacity of the image restoration filter storing unit 108a.

Embodiment 2

Figure 5:
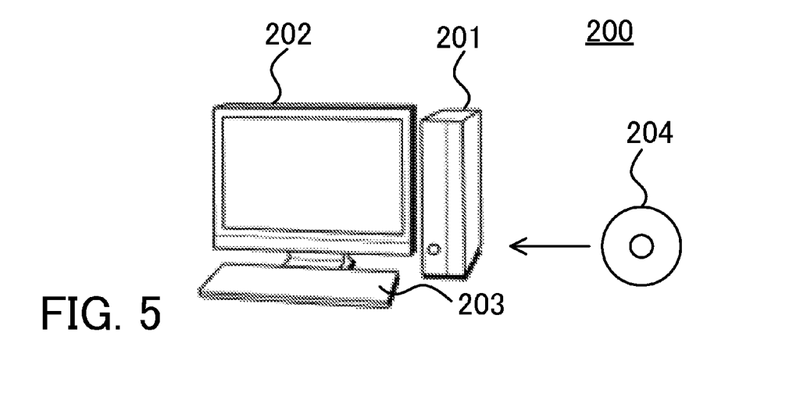
FIG. 5 is a configuration diagram of an image processing system in Embodiment 2.

Next, referring to FIG. 5, an image processing system (image processing apparatus) in Embodiment 2 of the present invention will be described. FIG. 5 is a configuration diagram of an image processing system 200 in this embodiment. The image processing system 200 includes an image processing apparatus 201 (hardware as an information processing apparatus), a display device 202 (monitor), and an input device 203 (input unit such as a keyboard). The image processing apparatus 201 includes the image restoration filter generating unit 104a, the image restoration filter storing unit 108a, and the optical transfer function storing unit 108b. This embodiment will describe a case in which the image processing method of Embodiment 1 operates on the image processing system 200 (software in a personal computer).

First, in order to cause the image processing method of each embodiment to operate on the image processing apparatus 201, the software (image processing program) which executes the image processing method is installed in the image processing apparatus 201 (personal computer). The software can be installed from a medium 204 (storage medium) such as a CD-ROM or a DVD-ROM. Alternatively, the software may be installed through download via a network (internet).

The software executes the functions of the image restoration filter generating unit and the image restoration processing unit described above. The optical transfer function storing unit, the image restoration filter storing unit, and storage regions to store a plurality of pieces of image capturing condition information are provided in a storage such as a hard disk in the image processing apparatus 201. The optical transfer function information stored in the optical transfer function storing unit can also be acquired via the internet.

As described above, in each embodiment, the image processing apparatus includes the image restoration filter storing unit 108a, the optical transfer function storing unit 108b, and the image restoration filter generating unit 104a. The image restoration filter storing unit 108a stores an image restoration filter corresponding to image capturing condition information such as a focal length, an F number, and an object distance. The optical transfer function storing unit 108b stores optical transfer function information (optical transfer function data). The image restoration filter generating unit 104a generates a first image restoration filter corresponding to first image capturing condition information of a captured image (image capturing condition information on the acquired captured image). When the first image restoration filter is stored in the image restoration filter storing unit 108a, the image restoration filter generating unit 104a selects the first image restoration filter from the image restoration filter storing unit 108a. On the other hand, when the first image restoration filter is not stored in the image restoration filter storing unit 108a, the image restoration filter generating unit 104a generates the first image restoration filter using the optical transfer function information.

Preferably, the image restoration filter stored in the image restoration filter storing unit 108a is a second image restoration filter corresponding to second image capturing condition information of a captured image acquired within a specific period of time. More preferably, the image restoration filter generating unit 104a generates the second image restoration filter corresponding to the second image capturing condition information of the captured image acquired within the specific period of time by using the optical transfer function information. Then, the image restoration filter storing unit 108a stores the generated second image restoration filter. Preferably, the image restoration filter generating unit 104a generates the second image restoration filter corresponding to the second image capturing condition information and an amount of restoration set via an input unit by a user by using the optical transfer function information. Preferably, the image restoration filter generating unit 104a generates the second image restoration filter corresponding to the second image capturing condition information of the captured image depending on an image capturing frequency within the specific period of time. Preferably, the specific period of time is a predetermined period of time or an arbitrary period of time settable by the user.

Preferably, the image restoration filter stored in the image restoration filter storing unit 108a is a third image restoration filter corresponding to third image capturing condition information set via the input unit. More preferably, the image restoration filter generating unit 104a generates the third image restoration filter corresponding to the third image capturing condition information and an amount of restoration set via the input unit by using the optical transfer function information. Then, the image restoration filter storing unit 108a stores the generated third image restoration filter.

Preferably, the image restoration filter generating unit 104a automatically generates the image restoration filter for each period of time set via the input unit. Then, the image restoration filter storing unit 108a updates and stores the image restoration filter for each set period of time. Preferably, the image processing apparatus includes the image restoration processing unit 104b which performs image restoration processing on the captured image by using the image restoration filter.

Each embodiment can provide an image processing apparatus, an image pickup apparatus, an image processing method, and a non-transitory computer-readable storage medium which improve the speed of the image restoration processing. Each embodiment is more effective when a high-speed photographing such as a continuous photographing is necessary.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-177861, filed on Sep. 2, 2014, which is hereby incorporated by reference herein in its entirety.

What is claimed is:

1. An image processing apparatus comprising:
an image restoration filter storing unit configured to store an image restoration filter corresponding to image capturing condition information;
an optical transfer function storing unit configured to store optical transfer function information; and
an image restoration filter generating unit configured to:
determine whether a first image restoration filter corresponding to first image capturing condition information of a captured image is stored in the image restoration filter storing unit,
select the first image restoration filter from the image restoration filter storing unit when the first image restoration filter is stored in the image restoration filter storing unit, and
generate the first image restoration filter using the optical transfer function information when the first image restoration filter is not stored in the image restoration filter storing unit,
wherein the image restoration filter stored in the image restoration filter storing unit is a second image restoration filter corresponding to second image capturing condition information of a captured image acquired within a specific period of time, and
wherein the image restoration filter storing unit is configured to store the second image restoration filter corresponding to the second image capturing condition information of the captured image depending on an image capturing frequency within the specific period of time.

2. The image processing apparatus according to claim 1, wherein:
the image restoration filter generating unit is configured to generate the second image restoration filter corresponding to the second image capturing condition information of the captured image acquired within the specific period of time by using the optical transfer function information, and the image restoration filter storing unit is configured to store the second image restoration filter.

3. The image processing apparatus according to claim 2, wherein the image restoration filter generating unit is configured to generate the second image restoration filter corresponding to the second image capturing condition information and an amount of restoration set via an input unit by using the optical transfer function information.

4. The image processing apparatus according to claim 1, wherein the specific period of time is a predetermined period of time or an arbitrary period of time settable by a user.

5. The image processing apparatus according to claim 1, wherein the image restoration filter stored in the image restoration filter storing unit is a third image restoration filter corresponding to third image capturing condition information set via an input unit.

6. The image processing apparatus according to claim 5, wherein:
the image restoration filter generating unit is configured to generate the third image restoration filter corresponding to the third image capturing condition information and an amount of restoration set via an input unit by using the optical transfer function information, and
the image restoration filter storing unit is configured to store the third image restoration filter.

7. The image processing apparatus according to claim 1, wherein:
the image restoration filter generating unit is configured to automatically generate the image restoration filter for each period of time set via an input unit, and
the image restoration filter storing unit is configured to update and store the image restoration filter for each period of time.

8. The image processing apparatus according to claim 1, further comprising an image restoration processing unit configured to perform image restoration processing on the captured image by using the image restoration filter.

9. An image pickup apparatus comprising:
an image pickup unit configured to photoelectrically convert an optical image formed via an image pickup optical system to output a captured image;
an image restoration filter storing unit configured to store an image restoration filter corresponding to image capturing condition information;
an optical transfer function storing unit configured to store optical transfer function information; and
an image restoration filter generating unit configured to:
determine whether a first image restoration filter corresponding to first image capturing condition information of the captured image is stored in the image restoration filter storing unit,
select the first image restoration filter from the image restoration filter storing unit when the first image restoration filter is stored in the image restoration filter storing unit, and
generate the first image restoration filter using the optical transfer function information when the first image restoration filter is not stored in the image restoration filter storing unit,
wherein the image restoration filter stored in the image restoration filter storing unit is a second image restoration filter corresponding to second image capturing condition information of a captured image acquired within a specific period of time, and
wherein the image restoration filter storing unit is configured to store the second image restoration filter corresponding to the second image capturing condition information of the captured image depending on an image capturing frequency within the specific period of time.

10. An image processing method comprising the steps of:
acquiring image capturing condition information of a captured image;
determining whether an image restoration filter corresponding to the image capturing condition information is stored in an image restoration filter storing unit;
acquiring the image restoration filter from the image restoration filter storing unit when the image restoration filter is stored in the image restoration filter storing unit; and
acquiring an optical transfer function information from an optical transfer function storing unit and generating the image restoration filter by using the optical transfer function information when the image restoration filter is not stored in the image restoration filter storing unit,
wherein the image restoration filter stored in the image restoration filter storing unit is a second image restoration filter corresponding to second image capturing condition information of a captured image acquired within a specific period of time, and
wherein the image restoration filter storing unit is configured to store the second image restoration filter corresponding to the second image capturing condition information of the captured image depending on an image capturing frequency within the specific period of time.

11. A non-transitory computer-readable storage medium storing an image processing program which causes a computer to execute a process comprising the steps of:
acquiring image capturing condition information of a captured image;
determining whether an image restoration filter corresponding to the image capturing condition information is stored in an image restoration filter storing unit;
acquiring the image restoration filter from the image restoration filter storing unit when the image restoration filter is stored in the image restoration filter storing unit; and
acquiring an optical transfer function information from an optical transfer function storing unit and generating the image restoration filter by using the optical transfer function information when the image restoration filter is not stored in the image restoration filter storing unit,
wherein the image restoration filter stored in the image restoration filter storing unit is a second image restoration filter corresponding to second image capturing condition information of a captured image acquired within a specific period of time, and
wherein the image restoration filter storing unit is configured to store the second image restoration filter corresponding to the second image capturing condition information of the captured image depending on an image capturing frequency within the specific period of time.

* * * * *